Feb. 7, 1933.  S. BRAMLEY-MOORE  1,896,696
BRAKE
Filed Oct. 2, 1930  2 Sheets-Sheet 1

Inventor:
S. Bramley-Moore
By Monroe Miller
Attorney.

Feb. 7, 1933.  S. BRAMLEY-MOORE  1,896,696
BRAKE
Filed Oct. 2, 1930  2 Sheets-Sheet 2

Inventor:
S. Bramley-Moore
By Monroe E. Miller
Attorney.

Patented Feb. 7, 1933

1,896,696

UNITED STATES PATENT OFFICE

SWINFEN BRAMLEY-MOORE, OF WHITE PLAINS, NEW YORK

BRAKE

Application filed October 2, 1930. Serial No. 485,986.

The present invention relates to brakes, and more particularly to brakes of the drum type such as are used on motor vehicles and the like.

An object of the present invention is to provide a relatively simple and efficient brake structure which may be easily and quickly adjusted to take up wear upon the brake lining and other parts of the apparatus from a position outside of the drum so that adjustment may be quickly and easily made and without taking down or separating any of the cooperating parts.

One of the principal features of the present invention is to provide a floating or self-aligning member for transmitting the necessary pressure or tension between the brake shoes and the source of power, and to provide such a member which will automatically take up wear and inequalities in settling an adjustment of the various parts within certain limits, and which may be subsequently quickly and easily adjusted to take up wear beyond a predetermined point, and which will also insure the proper and equal application of the pressure to the various brake shoes arranged within the drum.

Another purpose of the present invention is to provide a floating or self-aligning member which will automatically adjust itself to equalize the pressure between the various sets of brake shoes used in the drum so that the pressure will be uniformly transmitted throughout the entire inner circumference of the drum, and to provide an improved adjustment for this floating or self-aligning member which will not disturb its relation with respect to the several brake shoes but which at the same time will take up or compensate for undue wear.

A further object of the invention is to provide an improved construction of brake which is applicable to practically all types and designs of brakes shoes, links, flat springs, flat bars, rollers and the like and which admits of a large number of modifications or changes to suit practically any requirement in each individual case of application.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

Figure 1:
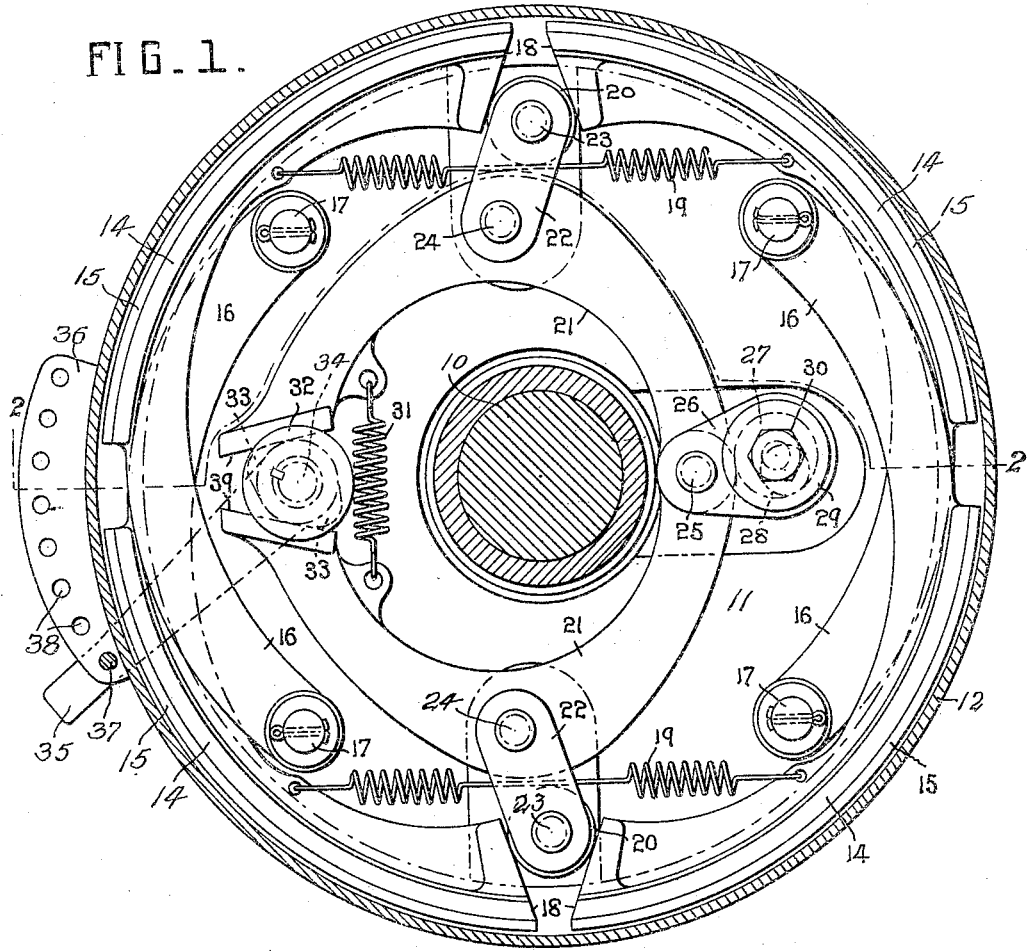
Figure 1 is a vertical section taken through the outer side portion of a brake constructed according to the present invention, the section being taken substantially on the line 1—1 of Fig. 2.
Figure 2:
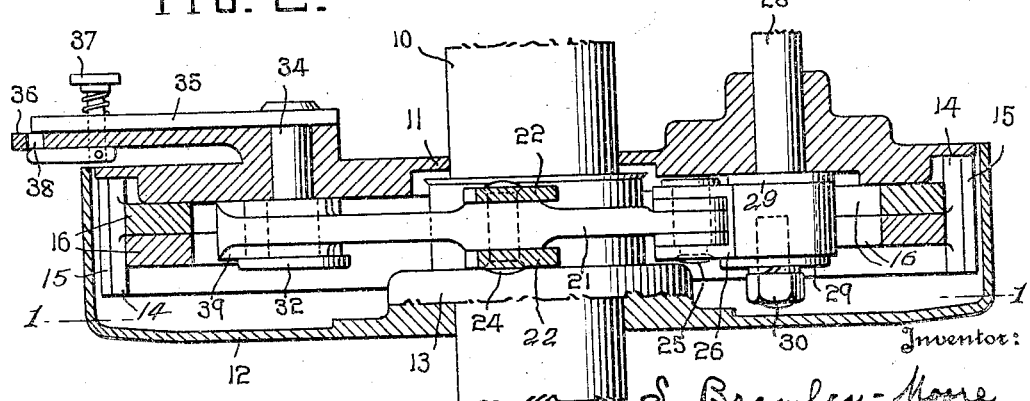
Fig. 2 is a transverse section taken through the same substantially on the line 2—2 of Fig. 1.

Referring now to the drawings, and first to Figs. 1 and 2, 10 designates a shaft about which are disposed in concentric relation a fixed or non-rotatable cover plate or disk 11 and a rotatable drum 12, the latter being closed at its outer side and mounted upon a hub 13 or the like. The cover plate or disk 11 is disposed substantially flush with the inner open side of the drum 12 so as to close the latter and seal the operating parts of the brake which are located within the drum.

According to the present illustration, the drum 12 is provided therein with two pairs of brake shoes 14 carrying suitable brake lining 15 adapted to engage the inner peripheral surface of the flanged portion of the drum 12. There is a pair of the brake shoes 14 disposed at each side of the vertical line of the drum 12, and the inner ends of the brake shoes 14 are provided each with a curved arm 16 of reduced width and disposed in relative offset relation so that the arms 16 of each pair of brake shoes cross one another and are pivotally anchored to the fixed cover plate or disk 11 by means of studs or pins 17, as clearly shown in Fig. 1. The free or outer ends of the brake shoes 14 are provided with inclined or cam ends 18 which are disposed in closely spaced apart relation and with the cam surfaces flaring inwardly and radially with respect to the axis of the drum.

For holding the brake shoes 14 normally in retracted position suitable springs 19 may be secured across the inner sides of the adjacent upper and lower brake shoes of each pair so as to normally urge the brake shoes inwardly away from the drum 12 and to thus urge the cam ends 18 toward each other.

A spreading roller 20 is disposed between each pair of cam ends 18, and the rollers 20 are of such diameter that when they are moved radially outward between the cam ends 18 they expand the brake shoes 14 and bind the latter against the inner sides of the drum 12 upon a relatively slight movement of the rollers. These rollers 20 are supported upon and actuated by a floating or self-aligning member 21. This self-aligning member 21 is constructed, designed and shaped to meet the various conditions found in brake construction, and in the present instance the floating member comprises a pair of substantially semi-circular arms which are connected to the rollers 20 intermediate the ends of the arms by means of links 22. Each roller 20 is provided with a pair of links 22 which are connected to the opposite sides of the roller by means of an axial pin 23, and the links 22 engage against the opposite sides of the adjacent arm of the floating member 21 and are pivotally secured thereto by a cross pin 24.

Figure 3:
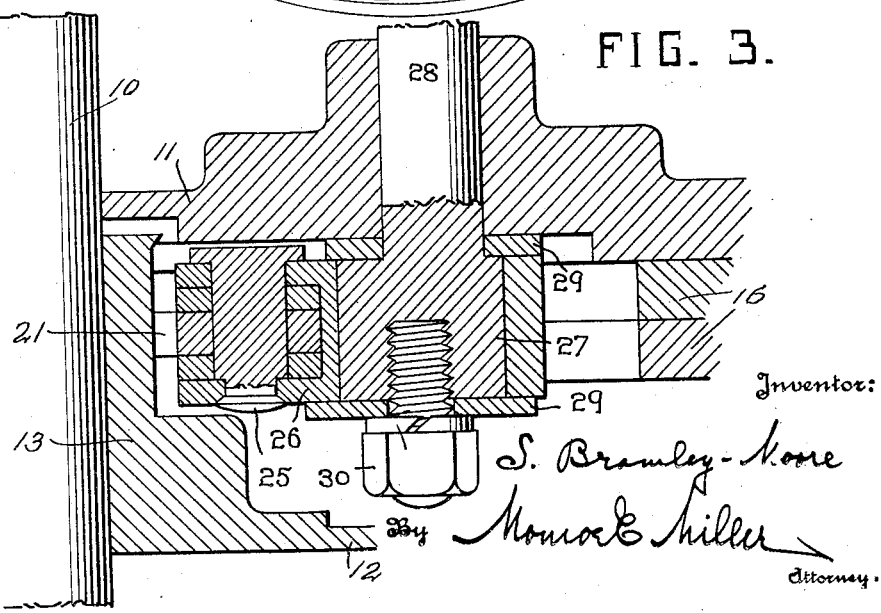
Fig. 3 is a detailed enlarged section taken horizontally through the operating eccentric and adjacent parts.

The arms of the floating member 21 are pivotally connected together at one end by a rivet 25 which also serves as the pivotal connection of a drag link 26 which extends outwardly from the floating member 21 and is suitably apertured to provide an eccentric hub or strap for the reception of an eccentric 27 carried on the adjacent end of a rock shaft 28 forming a part of the usual brake operating mechanism. The drag link 26 is held to the eccentric 27 in any suitable manner, such as by means of washers 29 and a threaded bolt 30, as clearly shown in Fig. 3.

The free ends of the arms of the floating member 21 are normally urged together by means of a spring 31 which is secured across the inner edges of the arms of the floating member for the purpose of drawing the links 22 and the rollers 20 inwardly and relieving the pressure between the cam ends 18 of the brake shoes 14 so that the springs 19 may retract the brake shoes.

The normal position of the roller 20 is determined by means of a spacer cam 32 which is located between the free ends of the arms of the floating member 21, as shown in Fig. 1, and which may be provided at opposite sides with diametrically opposed cam portions 33 adapted to simultaneously and equally engage the opposite ends of the arms of the floating member 21 when the cam 32 is turned. The cam 32 is mounted on a shaft 34 which has bearing through the stationary cover plate 11 and is provided upon its projecting end with an adjusting arm 35 arranged to traverse a locking sector 36. The arm 35 carries a locking pin 37 adapted to selectively engage through openings 38, one at a time, for holding the arm 35 in the desired angular position for moving and securing the cam 32 in such position as to maintain the free ends of the floating member 21 in the desired spaced apart relation.

It will be noted from Fig. 1 particularly, that the free ends of the arms of the floating member 21 are provided with outwardly converging bearing surfaces 39 which engage the opposite sides of the cam 32 and which are adapted to be drawn over the cam when the floating member 21 is shifted horizontally by the turning of the eccentric 27. As the cam 32 is a fixed member, the outwardly converging bearing surfaces 39 are separated by the shifting of the floating member and thus spread the arms of the floating member apart at their free ends and advance the rollers 20 into the spaces between the cam ends 18 of the brake shoes 14. The normal spaced apart position of the free ends of the floating member 21 is thus determined by the adjustment of the cam 32, and the bearing surfaces 39 are moved apart by the shifting of the floating member from any one of its various normal positions of adjustment. Thus, the rock shaft 28 may be operated to a predetermined angle which remains the same during the life of the brake and any wear or looseness of the parts within the brake drum may be quickly and easily taken up by the adjustment of the cam 32 to compensate for such lost motion or wear and therefore the brake will be operated effectively throughout its entire life without the necessity of turning the rock shaft 28 to any greater degree or angle after such wear or looseness takes place.

Figure 4:
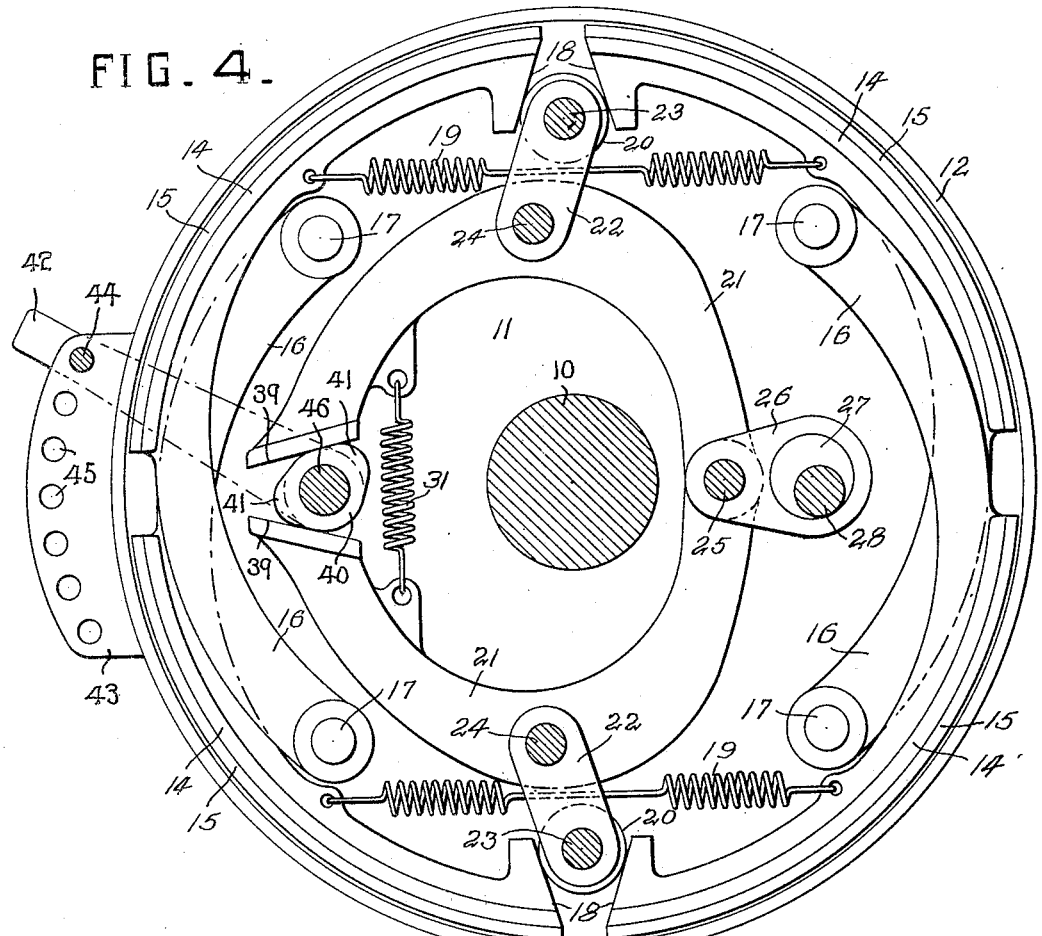
Fig. 4 is a view similar to Fig. 1, but showing a slight modification in the adjusting means for the brake.

With reference now to the modification shown in Fig. 4, it will be noted that this view is taken at the inner side of a brake drum with the fixed cover plate 11 removed, and wherein the structure is adapted to be used at the opposite side of the vehicle from the showing in Fig. 1. In this modification the adjusting means is shown in the form of a cam 40 which is similar to the cam 32 of Fig. 1 with the exception that the cam portions 41 are disposed in an opposite position with the upper cam portion 41 directed inwardly toward the axle 10 instead of outwardly as shown at 33 in Fig. 1 and the adjusting arm 42 in its retracted position is at the upper end of the sector 43 instead of at the lower end thereof as shown in Fig. 1. The arm 42 is held in adjusted position by the locking pin 44 which is selectively engaged in one of the openings 45 of the sector 43. The openings 45 are arranged in a circular row concentric to the shaft 46 of the cam 40.

From the above, the operation of the brake is apparent because when it is desired to apply the brake it is only necessary to turn the rock shaft 28 by means of the usual brake applying mechanism to turn the eccentric 27. The eccentric 27 may of course be turned in any suitable manner dependent upon the character of the brake operating mechanism, whether it be purely mechanical, whether it be of the hydraulic variety, or whether it be of any other suitable type or combination of types. When the eccentric 27 is turned the drag link 26 is drawn outwardly with respect to the axle 10 and the floating or self-aligning member 21 is thus moved crosswise in the drum. This movement of the floating member causes the converging bearing surfaces 39 thereof to ride over the opposite sides of the cam 32 with the result that the arms of the floating member are spread apart gradually depending upon the degree to which the floating member is shifted across the device. The shifting of the floating member together with the spreading of the arms thereof causes the links 22 to move outwardly toward the periphery of the drum 12 and to force the spreading rollers 20 in between the cam surfaces 18 of the brake shoes 14 with the result that the latter are forced apart and are swung outwardly against the inner side of the brake drum 12, springing the brake lining 15 into intimate and binding contact with a toggle lever action between the links and the free floating member. The member 21 is thus caused to automatically assume an intermediate position between the rollers 20 and the drag link 26 so that the pressure is exerted evenly between the drag link and the rollers 20. It is evident that the greater the distance the floating member 21 is shifted the greater will be the spreading of the rollers 20 as the bearing surfaces of the member 39 converge outwardly and are thus spread gradually and evenly apart during the shifting of the floating member from the normal releasing position toward the brake applying position. It will also be evident that the rollers 20 will be caused to exert equal and simultaneous pressure upon their respective cam ends 18 of the brake shoes so that where four brake shoes are employed, such as shown in the structure in Fig. 1, the pressure will be equally distributed to the four brake shoes and thus effect a uniform gripping action at practically all sides of the drum 12.

In order to take up wear upon the lining 15, the rollers 20 and other relatively movable and pivotally connected parts, the cam 32 may be turned so as to bring the raised portions 33 thereof more or less into play against the inclined bearing surfaces 39 of the floating member. This is effected by swinging the arm 35 over the sector 36 and locking the arm 35 in adjusted position by engaging the locking pin 37 in a selected opening 38. The result is that in the normal releasing position of the floating member the cam determines the spacing apart of the inclined bearing surfaces 39 without the necessity of taking up any of the lateral shifting movement of the floating member. The floating member 21 therefore has a full throw independently of any adjustment which may be made by virtue of the turning of the cam 32. It is also apparent that the cam 32 may be constructed to effect a relatively greater adjustment between the free ends of the arms of the floating member 21 so that considerable wear and play between the parts may be readily taken up without in any way affecting the distance through which the floating member and its operating parts may be operated, such distance of operation remaining substantially constant throughout the entire life of the brake.

Having thus described the invention, what is claimed as new is:

1. In a brake, a casing, opposed pairs of brake shoes pivoted to the casing and biased to a retracted position, projecting means for each pair of brake shoes, and a shiftable floating member, and relatively movable brake actuating means carried by said floating member and, connected between said projecting means for actuating the same.

2. In a brake, opposed pairs of normally retracted brake shoes, opposed wedging members arranged between each pair of brake shoes, operating means, and a free floating member arranged between the operating means and said wedging members adapted for self-alignment therebetween upon actuation of the operating means to evenly distribute the pressure of the wedge members upon the brake shoes.

3. In a brake, a casing, opposed pairs of brake shoes pivoted to the casing and biased to a retracted position, expanding means for each pair of brake shoes, a shiftable and expansible floating member, and relatively movable brake actuating means carried by said floating member and, connected between said expanding means for actuating the same, and means for expanding the floating member to take up wear on the brake shoes.

4. In a brake, opposed pairs of brake shoes biased to a retracted position, projecting means for the shoes of each pair, a floating member connected between the projecting means, shifting means for the floating member, means for expanding the floating member when shifted to actuate said projecting means, and means to adjust the expanding means for taking up wear and lost motion of the brake shoes.

5. In a brake, opposed pairs of brake shoes biased to a retracted position, projecting means for the shoes of each pair, a floating member comprising a pair of arms pivotally connected together at one end, links between the arms and said projecting means, shifting means for the floating member, means for spreading the ends of said arms when shifted to actuate said projecting means, and means to adjust the spreading means for taking up wear and lost motion of the brake shoes.

6. In a brake, opposed pairs of brake shoes biased to a retracted position, projecting means for the shoes of each pair, a floating member comprising a pair of arms pivotally connected together at one end, links between the arms and said projecting means, shifting means for the floating member, and means for spreading the ends of said arms when shifted to actuate said projecting means.

7. In a brake, opposed pairs of brake shoes biased to a retracted position, projecting means for the shoes of each pair, a floating member comprising a pair of arms pivotally connected together at one end and having outwardly converging bearing surfaces at their free ends, links between the arms and said projecting means, shifting means for the floating member, and an adjustable cam arranged between the free ends of said arms for spreading the same when said floating member is shifted to actuate said projecting means.

8. In a brake, opposed pairs of brake shoes biased to a retracted position, projecting means for the shoes of each pair, a floating member comprising a pair of arms pivotally connected together at one end and having outwardly converging bearing surfaces at their free ends, links between the arms and said projecting means, shifting means for the floating member, a double cam arranged between the free ends of said arms of the floating member and adapted to engage the bearing surfaces thereof for spreading the arms when the floating member is shifted to actuate said projecting means, and means for adjustably securing said cam in various angular positions between said bearing surfaces of the arms of said floating member.

9. In a brake, opposed pairs of brake shoes biased to a retracted position, projecting means arranged between the shoes of each pair, a floating member comprising a pair of arms pivotally connected together at one end and having converging bearing surfaces at their free ends, links arranged between the intermediate portions of said arms and said projecting means, an operating eccentric, a drag link mounted on said eccentric and connected to a pivotal connection of said arm for shifting the latter, means normally urging the free ends of said arms together, a double cam arranged between the free ends of said arms and engaging said converging bearing surfaces thereof and adapted to separate said arms upon the shifting of the floating member by said eccentric to actuate said projecting means, and means for adjustably holding said cam in angularly adjusted position between said bearing surfaces of the arms to take up wear and lost motion of the brake shoes.

10. In a brake, a casing, opposed pairs of brake shoes pivoted to the casing and biased to a retracted position, a shiftable free floating member connected to the brake shoes for operating the latter, and means carried by the casing for bodily adjusting the floating member for adjusting the brake shoes to take up wear on the latter.

In testimony whereof I hereunto affix my signature.

SWINFEN BRAMLEY-MOORE.